July 17, 1962 R. L. MITCHELL ET AL 3,045,007
PROCESS AND APPARATUS FOR PRODUCING HYDROXYETHYLCELLULOSE
Filed April 7, 1959
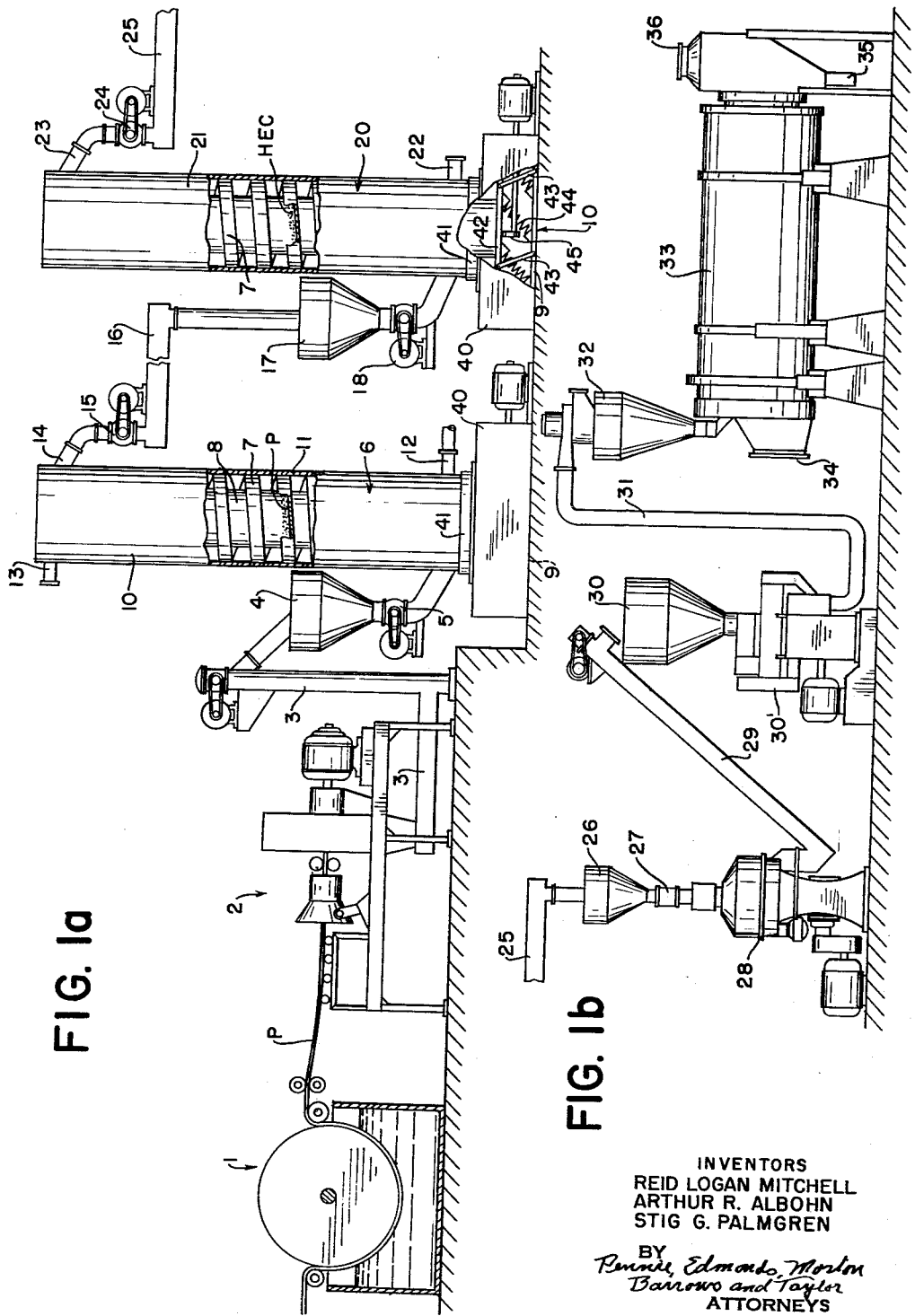
FIG. Ia
FIG. Ib
INVENTORS
REID LOGAN MITCHELL
ARTHUR R. ALBOHN
STIG G. PALMGREN
BY
Pennie, Edmonds, Morton
Barrows and Taylor
ATTORNEYS United States Patent Office 3,045,007
Patented July 17, 1962

3,045,007
PROCESS AND APPARATUS FOR PRODUCING HYDROXYETHYLCELLULOSE
Reid Logan Mitchell, Morristown, and Arthur R. Albohn, Whippany, N.J., and Stig G. Palmgren, Greenwich, Conn., assignors to Rayonier Incorporated, Shelton, Wash., a corporation of Delaware
Filed Apr. 7, 1959, Ser. No. 804,789
4 Claims. (Cl. 260—231)

This invention relates to the production of hydroxyethylcellulose (HEC), and has for its object the provision of an improved process for the reaction of ethylene oxide gas with alkali cellulose in producing HEC. The invention provides an effective continuous process for treating a bed of fibrous alkali cellulose particles with ethylene oxide gas for producing an improved form of HEC which is amenable to efficient washing, drying and pelletizing.

One of the difficulties in producing a commercially satisfactory HEC product is to achieve uniformity of substitution of ethylene oxide on the cellulose. Although this has been possible in the treatment of webs or sheets of cellulose, first with sodium hydroxide to form alkali cellulose and then with ethylene oxide, there has been no satisfactory method employed for the production of HEC from a bed or loose bulky mass of fibrous particles of cellulose in a continuous operation. This invention is based on the discovery that a bed or loose bulky mass of alkali cellulose fibers advanced over a vibrating conveyor while in contact with the gaseous ethylene oxide effects complete penetration of the mass, controlled retention time, and results in a uniform and effective reaction.

The process of the invention makes it possible to move continuously a bulky thick mass of particulate cellulose, previously reacted with sodium hydroxide solution, into reacting contact with ethylene oxide to form the HEC, and then to move it at a sufficiently delayed rate to effect aging and etherification while in contact with the ethylene oxide gas. The vibratory conveyor system used in the process progressively moves the cellulose through the gas chamber in a multiplicity of strokes which lift the cellulose and let it fall alternately increasing and decreasing the space between the material and the conveyor. This sets up a sort of pumping or breathing action which forces the ethylene oxide gas back and forth through the moving mass of alkali cellulose.

The invention also provides a reactor apparatus comprising means for vibrating a solid, loose or bulky material and confining the vibrating means and material within a gas-tight chamber, together with means for the admission of gas to the chamber for reaction with the material.

The apparatus of the invention comprises a spiral vibratory conveyor of well known type and construction mounted and operated within a gas-tight chamber such as a tower, said conveyor being arranged to move the bed of material to be reacted with gas progressively upward or downward within the gas-tight chamber. The tower is provided with means for the supply and removal of gas, the control of pressure and temperature, and the rate of vibration to control the through-put of the reacted material and the breathing of a given bed depth. In one of its embodiments the apparatus comprises two conveyors connected together in series, one in which the material is fed upwardly to its top and then delivered through an enclosed duct to the bottom of the other reactor for a repetition of the upward movement. Suitable feed and delivery valves are provided to permit different types of processing to be carried out in the two. For example, in the process of the invention, one conveyor can be used as a reactor and the other for aging or depolymerizing. This apparatus has various other uses, for example, it may be used in connection with the viscose process to treat alkali cellulose with carbon bisulfide for xanthation in one reactor and aging in the other.

The accompanying drawing illustrates more or less diagrammatically an arrangement of apparatus for carrying out a complete process of the invention, and also a reactor embodying the invention. In the apparatus shown, FIGS. 1a and 1b are shown in the two parts because of the length; actually the apparatus is continuous.

The apparatus illustrated comprises a unit 1 for the conversion of sheets of cellulose pulp to alkali cellulose. A preferred apparatus and operation are described more fully in Patent Number 2,614,102 of Schlosser and Mitchell. In the process of this patent the sodium hydroxide steeping solution is forced through the sheet of cellulose pulp P in an operation known as the pull-through treatmeant which effects a uniform conversion of the cellulose to the desired degree of alkalization.

The sheet of alkali cellulose pulp P from which the excess of caustic has been removed by suction and pressure is passed into a continuous disc shredder 2 to disintegrate the sheet into a fibrous mass which is deposited into the conveyor duct 3 from which it is passed by mechanical feed means such as a screw into the hopper 4. It is to be understood that the alkali cellulose may also be formed from bulky cellulose in a slurry steeping operation which form of fibrous alkali cellulose may be passed into the shredder or deposited directly into the hopper 4 for the continuation of the process. It will be noted that the duct 3 and hopper 4 are completely enclosed for the exclusion of the atmosphere. The alkali cellulose in hopper 4 is fed through a rotary gas-tight feed valve 5 into the lower portion of the reactor 6. Any suitable valve of the type for feeding a solid into a duct or chamber containing a confined gas may be used for this purpose.

The reactor comprises a spiral vibratory converor 7 supported around a central shaft 8 and mounted for vibration on the base 9. The vibration imparting device 10 is mounted on the base and is arranged to impart vibrations in the conveyor at the desired natural frequency and amplitude. The conveyor is generally cylindrical on the exterior and is entirely enclosed within a housing, for example a tower structure 11, which provides a gas-tight chamber within. A suitable form of vibratory spiral conveyor is manufactured by the Carrier Conveyor Corporation of Louisville, Kentucky. Each of these conveyors has an electrically driven vibrator on the base 9 as illustrated in reactor 20. The conveyor illustrated is a spiral trough rectangular in cross-section, open at the top and the fibrous cellulose P travels up the conveyor due to the vibration.

Reactor 6 has an inlet 12 for ethylene oxide gas and an outlet 13 for this gas which permits it to be recirculated through the system with suitable pumping means not shown. The entire area surrounding the conveyor is maintained at an atmosphere of gaseous ethylene oxide at the required temperature and pressure. The heating may be effected by heating the circulating ethylene oxide or by steam coils or electric elements or other conventional means within the housing.

The HEC formed in the reactor 6 is discharged into the duct 14 from which it is fed through the gas-tight power-driven valve 15 into the feed duct 16 which is provided with a screw to deposit the HEC in the hopper 17. The valve 15 prevents the free passage of ethylene oxide gas into the duct 16.

The HEC is passed from the hopper 17 through gas-tight feed valve 18 into the lower portion of the reactor 20. This reactor may be similar to reactor 6 and is operated in the process of the invention to effect an aging of the HEC. This aging is carried out by subjecting the HEC to controlled oxidation with air or oxygen maintained at proper temperature within the housing or tower 21 by the supply of these gases through inlet 22. The suitably aged HEC is discharged into the duct 23 from which it is fed through the motor-driven gas-tight valve 24 into the worm feed duct 25. The valve 24 prevents the passage of any appreciable quantity of gas from the tower 21 into duct 25. The aged HEC is discharged into the hopper 26. From this hopper the HEC is charged at the desired rate through feed valve 27 into a washing apparatus 28 preferably a continuous centrifugal washer. This operation is carried out with water to remove residual caustic and water-soluble by-products. The weak caustic solution from this operation may be sent to the caustic make-up section for recovery and re-use in the steeping operation.

The resulting washed HEC in the form of particulate crumb is passed through the conveyor 29 and dumped into the hopper 30. From the hopper 30 the crumb passes through a pellet mill 30' to compress the material into relatively dense and fairly uniform pellets varying in size, say, from 1/8 to 3/8 inch in diameter. These pellets may be formed by the extrusion of the HEC through dies to form rods which break up into short sections during extrusion. The pellets are passed through the conveyor 31 and dumped into hopper 32 from which they are fed through a rotary drier wherein they are dried with a flow of hot air blown into the drier 33 through the opening 34. The operation may be carried out at atmospheric pressure or at other pressures provided by the circulating pump (not shown). The dried pellets are discharged through the opposite end 35 and the moisture-laden hot air is discharged to the atmosphere at 36. The pellets may be bagged for shipment or transferred to other processing operations.

One of the important features in the process of the invention is the reaction of the alkali cellulose fibers with the ethylene oxide in the reactor 6. In this operation a relatively deep bed of the loose and bulky cellulose fibers P is progressively and continuously moved through the reactor while in contact with ethylene oxide gas at the desired temperature and pressure. The vibration of the conveyor 7 effects the well known upward movement of the material. This movement, properly balanced as to frequency and amplitude, causes the material to rise and fall many times per second causing a sort of pumping action resulting in a deep penetration of the mat of fibers by the reactant gas due to negative pressure. In other words, the gas is sucked in and out through the mat many times per second resulting in a complete and uniform contact of all the fibers with the gas.

It is one of the objects of the invention to produce pellets of HEC as a product for shipment to the industry for use in economical minimum-size operations for spinning filaments, forming sheets or other related products. The operation may be controlled both as to the steeping with sodium hydroxide and the etherification with ethylene oxide to form a product having the desired solubility characteristics as described more fully in the Mitchell et al. Patent 2,847,411. As a specific objective, the operation may be carried out to effect uniform alkalization on high alpha cellulose pulp of the type having relatively uniform chain lengths and the treatment of the alkalized cellulose with ethylene oxide so as to substitute on the cellulose from about 2% to about 8% of ethylene oxide and form HEC which is substantially all soluble in a 5% aqueous sodium hydroxide solution at about 0° C. but which is substantially insoluble in water. A product of this character has the important feature of being washable with water to remove excess caustic and by-products without appreciably dissolving and wasting HEC. The resulting dried and pelletized product may be easily solubilized in the dilute caustic solution for subsequent treatment and use.

The reactor, 6 or 20, of the invention, as previously described, consists of a vibratory conveyor 7 enclosed within the gas-tight housing 20. This housing makes a gas-tight connection with the base closure 40 at 41. The platform 42 on which the conveyor 7 is attached is connected to the base 9 by angular links 43 and springs 44. The motor-driven eccentric cam 45 moves the conveyor up and down while the springs and links impart a lateral motion. As used for the purpose of the invention, the amplitude of motion may vary from about 1/4 to 1 inch at a frequency of from 500 to 700 cycles per minute. The amplitude and frequency can be adjusted to effect both the amount of breathing and the retention time for the particular equipment to insure completeness of the reaction.

We claim:
1. The process for producing hydroxyethylcellulose which comprises substantially continuously passing a bed of fibrous particles of alkali cellulose fibers through a chamber containing ethylene oxide gas, subjecting the bed of fibrous particles to a progressive forward movement, and simultaneously with said progressive forward movement repeatedly causing portions of the bed to rise and fall in rapid succession with resulting entrapment of the ethylene oxide gas in the bed as said portions rise, and expulsion of the entrapped ethylene oxide gas as said portions fall, thereby causing a pumping action with respect to the ethylene oxide gas which causes said gas to deeply penetrate the bed and react uniformly with the fibrous particles thereof.

2. In the process of claim 1, vibrating the bed from 500 to 700 cycles per second at an amplitude of from 1/2 to 1 inch.

3. An apparatus for reacting a solid with a gas which comprises a spiral vibratory conveyor having its axis in an upright position, means for vibrating the conveyor to cause solid material thereon to move progressively over the conveyor, a housing providing a gas-tight chamber around the conveyor, means for supplying solid material to and removing it from the conveyor, and means for maintaining a reacting gas in the chamber.

4. Apparatus according to claim 3 which comprises means for maintaining a predetermined temperature and pressure in the chamber.

References Cited in the file of this patent
UNITED STATES PATENTS

| | | |
|---|---|---|
| 1,863,208 | Shorger | June 12, 1932 |
| 2,689,784 | Kulp et al. | Sept. 21, 1954 |
| 2,812,063 | Pratt | Nov. 5, 1957 |